(12) United States Patent
Johansson et al.

(10) Patent No.: US 12,340,692 B2
(45) Date of Patent: Jun. 24, 2025

(54) VEHICLE CONTROL SYSTEM, METHOD AND A COMPUTER PROGRAM PRODUCT FOR ENERGY EFFICIENT DRIVING

(71) Applicant: Ningbo Geely Automobile Research & Development Co., Ltd., Ningbo (CN)

(72) Inventors: Jonathan Johansson, Gothenburg (SE); Pardis Shariatzadeh, Västra Frölunda (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 306 days.

(21) Appl. No.: 17/708,796

(22) Filed: Mar. 30, 2022

(65) Prior Publication Data

US 2022/0223040 A1    Jul. 14, 2022

Related U.S. Application Data

(63) Continuation of application No. PCT/CN2020/121281, filed on Oct. 15, 2020.

(30) Foreign Application Priority Data

Oct. 18, 2019    (EP) ..................................... 19204084

(51) Int. Cl.
   *G08G 1/0967*    (2006.01)
   *B60W 60/00*    (2020.01)
   *B60W 30/18*    (2012.01)

(52) U.S. Cl.
   CPC ... *G08G 1/096791* (2013.01); *B60W 60/0023* (2020.02); *G08G 1/096708* (2013.01);
(Continued)

(58) Field of Classification Search
   CPC ...... G08G 1/096791; G08G 1/096708; B60W 60/0023; B60W 30/18154;
(Continued)

(56) References Cited

U.S. PATENT DOCUMENTS 9,672,734 B1    6/2017    Ratnasingam
9,898,928 B1 *    2/2018    Payne .............. G08G 1/096716
(Continued)

FOREIGN PATENT DOCUMENTS

CN    102762428 A    10/2012
CN    109109854 A    1/2019
(Continued)

OTHER PUBLICATIONS

International Search Report from corresponding International Application No. PCT/CN2020/121281, mailed on Jan. 19, 2021, 2 pages.
(Continued)

*Primary Examiner* — Isaac G Smith
(74) *Attorney, Agent, or Firm* — Tucker Ellis LLP

(57) ABSTRACT

A vehicle control system for energy efficient driving includes a processing circuitry configured to cause the vehicle control system to: determine that the vehicle is approaching a stop point; determine if the vehicle needs to stop at the stop point; determine the presence of at least a first other vehicle within a predefined distance behind the vehicle; and determine the intended route of the at least first other vehicle for determining if the vehicle is going to prepare at least a first energy saving action or not.

20 Claims, 5 Drawing Sheets

(52) U.S. Cl.
CPC . *B60W 30/18154* (2013.01); *B60W 2420/403* (2013.01); *B60W 2552/10* (2020.02); *B60W 2554/4041* (2020.02); *B60W 2554/4045* (2020.02); *B60W 2554/802* (2020.02); *B60W 2555/60* (2020.02); *B60W 2556/65* (2020.02); *B60W 2756/10* (2020.02)

(58) Field of Classification Search
CPC ....... B60W 2420/403; B60W 2552/10; B60W 2554/4041; B60W 2554/4045; B60W 2554/802; B60W 2555/60; B60W 2556/65; B60W 2756/10
USPC .......................................................... 701/24
See application file for complete search history.

(56) References Cited

U.S. PATENT DOCUMENTS

| | | | |
|---|---|---|---|
| 2014/0012478 A1* | 1/2014 | Schulz | B60W 30/16 701/93 |
| 2014/0371974 A1* | 12/2014 | Huelsebusch | |
| 2015/0332103 A1* | 11/2015 | Yokota | G06F 16/5854 348/149 |
| 2018/0037227 A1 | 2/2018 | D'Sa | |

FOREIGN PATENT DOCUMENTS

| | | | |
|---|---|---|---|
| CN | 109804420 | A | 5/2019 |
| CN | 109841088 | A | 6/2019 |
| CN | 110035918 | A | 7/2019 |
| EP | 2657921 | A1 | 10/2013 |
| JP | 2016075251 | A | 5/2016 |
| KR | 20170044940 | A * | 4/2017 |
| WO | 2013187835 | A1 | 12/2013 |

OTHER PUBLICATIONS

Bin Hu et al., "A Joint Vehicle/Vehicle-Roadside Communication Protocol for Highway Traffic Safety," International Journal of Vehicular Technology, vol. 2011, Article ID 718048, Feb. 24, 2011, 6 pages.

* cited by examiner

VEHICLE CONTROL SYSTEM, METHOD AND A COMPUTER PROGRAM PRODUCT FOR ENERGY EFFICIENT DRIVING

RELATED APPLICATION DATA

This application is a continuation of International Patent Application No. PCT/CN2020/121281, filed Oct. 15, 2020, which claims the benefit of European Patent Application No. 19204084.8, filed Oct. 18, 2019, the disclosures of which are incorporated herein by reference in their entireties.

TECHNICAL FIELD

The present disclosure relates to a vehicle control system and a method for energy efficient driving when a vehicle is approaching a stop point.

BACKGROUND

Today when a vehicle is approaching a stop point, such as an intersection with a traffic light or a roundabout with traffic, the vehicle occupant of the vehicle needs to observe the traffic situation, e.g. if the traffic light at an intersection is signaling red or if the vehicle needs to give way for other traffic in a roundabout, dependent on the intended route of the vehicle.

If the vehicle is for example approaching a traffic light that is signaling red for the intended route, then the vehicle needs to come to a stop before the red light. It is common that vehicle occupants maintain a drive load on the engine even if the red light is observed and the vehicle occupant knows that the vehicle needs to come to a stop. The effect is often that the vehicle occupant needs to brake the vehicle when the vehicle is close to the red light.

An energy efficient way to come to a stop when approaching a stop point is to release the engine from drive load and let the vehicle just roll all the way up to the traffic light before coming to a full stop. This also e.g. minimizes wear of the brakes of the vehicle. The traffic light may even change to green while rolling, and a full stop can then be avoided. In this way energy can be saved compared to keeping a drive load on the engine.

For an electric vehicle, the rolling can be used for charging the batteries of the electric vehicle, and hence energy is not only saved, but even stored.

It is however not always desirable to release the engine from drive load and let the vehicle just roll all the way up to the traffic light before coming to a full stop since there may be other directions open at the traffic light where there is no need to come to a stop. In the example when the vehicle is approaching a traffic light that is signaling red for the intended route, the same traffic light may be signaling green for another direction other than the intended route of the vehicle. Such other directions may be desirable directions for other vehicles behind the vehicle that are approaching the traffic light, and the vehicle may then block other vehicles that have a desire to go in the direction that is green. Therefore, considerations where other vehicles are going is desirable in order to apply energy efficient driving in some situations. It can be difficult for a vehicle occupant to judge where other vehicles are going.

The same principles apply to autonomous vehicles. Further, in an autonomous vehicle there may however not be a vehicle occupant in the vehicle that can observe the traffic situation when approaching a stop point.

Energy efficient driving is desired both for autonomous vehicles and non-autonomous vehicles in order to preserve energy.

SUMMARY

It is an object of the present disclosure to mitigate, alleviate or eliminate one or more of the above-identified deficiencies and disadvantages in the prior art and solve at least the above-mentioned problem. For a non-autonomous vehicle there is a need for a control system that can support the vehicle occupant in driving the vehicle in an energy efficient way. For an autonomous vehicle, there is a further need to replace the vehicle occupant that is observing the traffic situation with a control system that is configured to automatically support with decisions for autonomous driving of the vehicle.

According to a first aspect there is provided a vehicle control system for energy efficient driving, the vehicle control system comprises: a processing circuitry configured to cause the vehicle control system to: determine that the vehicle is approaching a stop point; determine if the vehicle needs to stop at the stop point; determine the presence of at least a first other vehicle within a predefined distance behind the vehicle; and determine the intended route of the at least first other vehicle.

An advantage with this aspect is that with knowledge of the intended route of the at least first other vehicle, a decision to control the vehicle or to instruct a vehicle occupant can be taken considering the intended route of the least first other vehicle to avoid e.g. blocking the way for the at least first other vehicle.

According to some embodiments, in a determination that the at least first other vehicle is going in the same direction as the vehicle after the stop point, preparing at least a first energy saving action.

Knowing that the at least first other vehicle is going in the same direction means that the vehicle is not blocking the way for the at least first other vehicle, and hence a first energy saving action can be prepared, such as releasing the engine from drive load.

According to some embodiments, in a determination that the at least first other vehicle is going in another direction as the vehicle after the stop point, preparing at least a first energy saving action only when the at least first other vehicle is in a different lane, other than the lane of the vehicle, for avoiding blocking the way for the at least first other vehicle.

Knowing that the at least first other vehicle is going another direction means that the vehicle is blocking the way for the at least first other vehicle when the vehicle and the at least first other vehicle are in the same lane, and by waiting with preparing for the at least first energy saving action until the at least first other vehicle is in another lane it can be avoided that the vehicle is blocking the way for the at least first other vehicle.

According to some embodiments, the vehicle control system further comprises: a wireless communication unit, operatively connected to the processing circuitry, configured to communicate via a wireless communication network, the processing circuitry is further configured to cause the vehicle control system to: send, by the vehicle, a request for a traffic information data message indicative of a request for the intended route of at least a first other vehicle behind the vehicle; receive, at the vehicle, the traffic information data message indicative of the intended route of the at least first other vehicle behind the vehicle.

Information of the intended route of the at least first other vehicle can hence be provided wirelessly to the vehicle over the air in a traffic information data message that is informing the vehicle of the intended route of the at least first other vehicle.

According to some embodiments, the vehicle control system further comprises: at least a first exterior view camera operatively connected to the processing circuitry configured to obtain image data of the surroundings of the vehicle, the processing circuitry is further configured to cause the vehicle control system to: obtain, by the at least first exterior view camera of the vehicle, image data of the surroundings of the vehicle; and determine an intended route of at least a first other vehicle behind the vehicle based on the obtained image data.

Information of the intended route of the at least first other vehicle can hence be provided via image data of the surroundings of the vehicle, providing information about the intended route of the at least first other vehicle.

According to a second aspect there is provided a method for energy efficient driving of a vehicle, the method comprising: determining that the vehicle is approaching a stop point; determining if the vehicle needs to stop at the stop point; determining the presence of at least a first other vehicle within a predefined distance behind the vehicle; and determining the intended route of the at least first other vehicle.

An advantage with this aspect is that with knowledge of the intended route of the at least first other vehicle, a decision to control the vehicle or to instruct a vehicle occupant can be taken considering the intended route of the least first other vehicle to avoid e.g. blocking the way for the least first other vehicle.

According to some embodiments, in a determination that the at least first other vehicle is going in the same direction as the vehicle after the stop point, preparing at least a first energy saving action.

Knowing that the at least first other vehicle is going in the same direction means that the vehicle is not blocking the way for the at least first other vehicle, and hence a first energy saving action can be prepared, such as releasing the engine from drive load.

According to some embodiments, in a determination that the at least first other vehicle is going in another direction as the vehicle after the stop point, preparing at least a first energy saving action only when the at least first other vehicle is in a different lane, other than the lane of the vehicle, for avoiding blocking the way for the at least first other vehicle.

Knowing that the at least first other vehicle is going another direction means that the vehicle is blocking the way for the at least first other vehicle when the vehicle and the at least first other vehicle are in the same lane, and by waiting with preparing for the at least first energy saving action until the at least first other vehicle is in another lane it can be avoided that the vehicle is blocking the way for the at least first other vehicle.

According to some embodiments, the method further comprises: sending, by the vehicle, a request for a traffic information data message indicative of a request for the intended route of at least a first other vehicle behind the vehicle; receiving, at the vehicle, the traffic information data message indicative of the intended route of the at least first other vehicle behind the vehicle.

Information of the intended route of the at least first other vehicle can hence be provided wirelessly to the vehicle over the air in a traffic information data message that is informing the vehicle of the intended route of the at least first other vehicle.

According to some embodiments, the traffic information data message is sent and received via at least any of a wireless Vehicle-to-vehicle communication network; a wireless Vehicle-to-Infrastructure communication network; and a wireless Internet communication network.

Information of the intended route of the at least first other vehicle can hence be provided wirelessly to the vehicle over the air, via direct communication between the vehicle and the at least first other vehicle, and/or via communication between the vehicle and an infrastructure node, and/or via communication between the vehicle and a wireless Internet communication network node.

According to some embodiments, the method further comprises: obtaining, by at least a first exterior view camera of the vehicle, image data of the surroundings of the vehicle; and determining an intended route of at least a first other vehicle behind the vehicle based on the obtained image data.

Information of the intended route of the at least first other vehicle can hence be provided via image data of the surroundings of the vehicle, providing information about the intended route of the at least first other vehicle.

According to some embodiments, the determination of the intended route of the method comprises a determination of at least any of an indication that a turn signal of the at least first other vehicle is on or that the at least first other vehicle is changing lane.

With knowledge of an activated turn signal, it can be determined that the at least first other vehicle is going in a certain direction, and with knowledge that the at least first other vehicle is changing lane it can also be determined that the at least first other vehicle is going in a certain direction.

According to some embodiments, determining if the vehicle needs to stop at the stop point comprises receiving by the vehicle a stop signal via at least any of a wireless Vehicle-to-vehicle communication network; a wireless Vehicle-to-Infrastructure communication network; and a wireless Internet communication network, indicative of that the vehicle needs to stop at the stop point.

The vehicle can hence be informed wirelessly over the air in stop signal data message that the vehicle needs to stop at a certain stop point that is approaching.

According to some embodiments, determining if the vehicle needs to stop at the stop point comprises: obtaining, by at least a first exterior view camera of the vehicle, image data of the surroundings of the vehicle; and determining stop information based on the obtained image data.

The vehicle can hence be informed via image data of the surroundings of the vehicle, that the vehicle needs to stop at a certain stop point that is approaching, e.g. via a determination of a traffic light signaling red.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
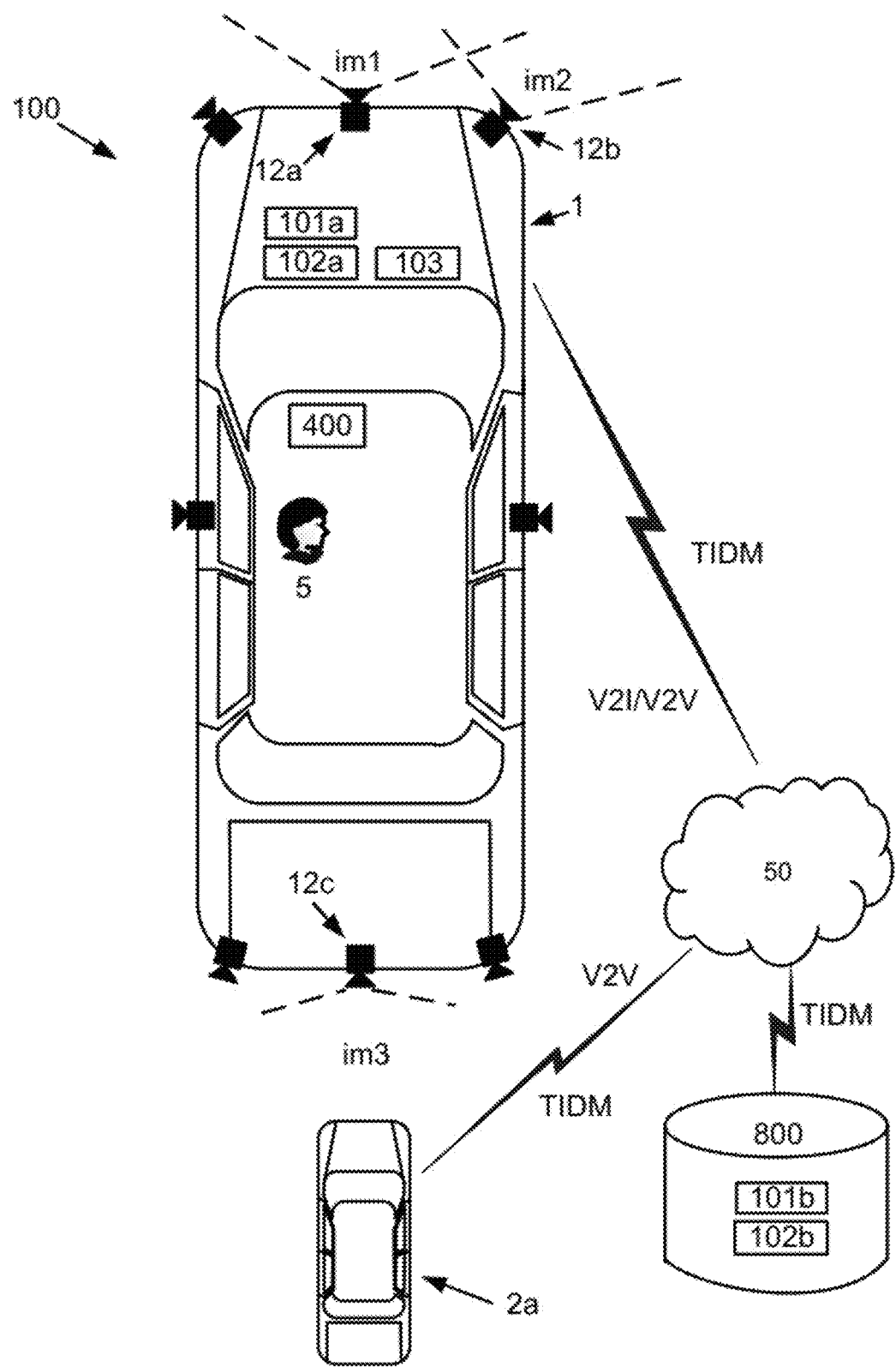
FIG. 1 illustrates an overview of the vehicle control system.

The first aspect of this disclosure shows a vehicle control system 100 for energy efficient driving. FIG. 1 illustrates an overview of the vehicle control system 100. The vehicle control system 100 comprises a processing circuitry 102a, 102b. According to some embodiments the processing circuitry 102a is the processing circuitry of an on-board vehicle computer. According to some embodiments the processing circuitry 102b is comprised in an electronic device 800 connected to the vehicle control system 100 via a wireless communication network 50, as illustrated in FIG. 1.

According to some embodiments the vehicle control system 100 further comprises a memory 101a, 101b configured to store data. According to some embodiments the memory 101a is the memory of an on-board vehicle computer. According to some embodiments the memory 101b is comprised in an electronic device 800 connected to the vehicle control system 100 via a wireless communication network 50, as illustrated in FIG. 1.

In one example the wireless communication network 50, as illustrated in FIG. 1 is a standardized wireless local area network such as a Wireless Local Area Network, WLAN, Bluetooth™, ZigBee, Ultra-Wideband, Radio Frequency Identification, RFID, or similar network. In one example the wireless communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some aspects the wireless communication network 50 can also be a combination of both a local area network and a wide area network. According to some embodiments the wireless communication network 50 is defined by common Internet Protocols.

Figure 2A:
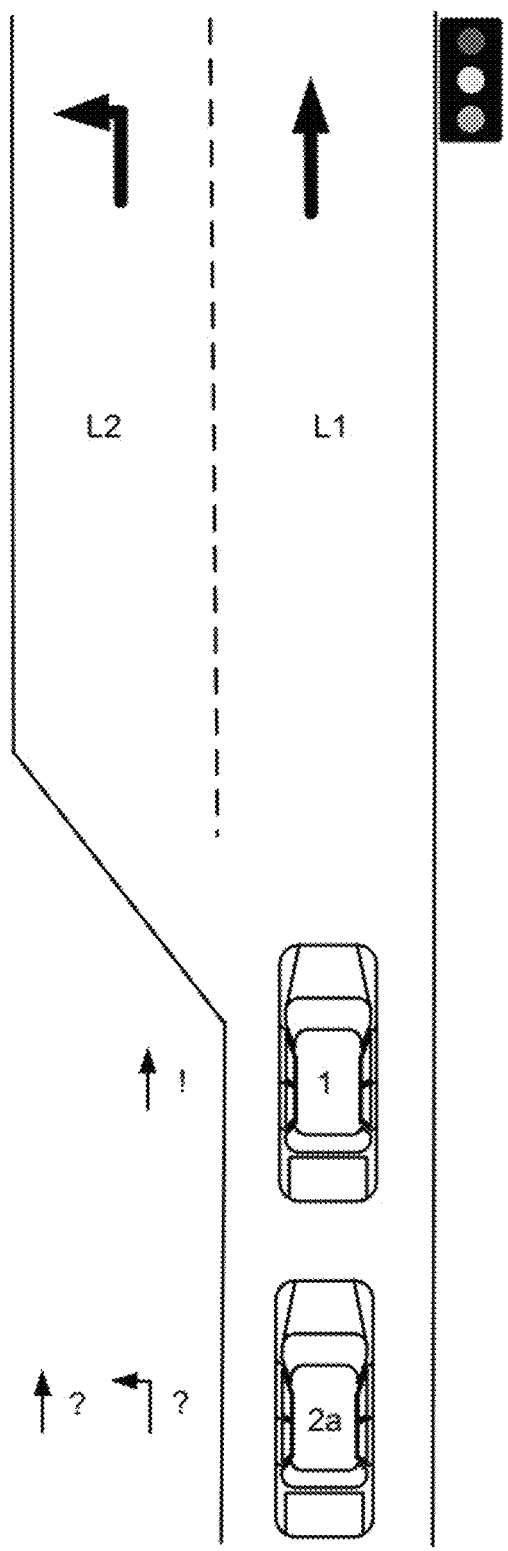
FIG. 2A illustrates an example when the vehicle and a first other vehicle are approaching a stop point at a traffic light when the intended route of the first other vehicle is not determined.

FIG. 2A illustrates an example when the vehicle 1 and a first other vehicle 2a are approaching a stop point at a traffic light when the intended route of the first other vehicle 2a is not determined. In a situation when the intended route of the first other vehicle 2a is not determined, the vehicle 1 may risk blocking the first other vehicle 2a if e.g. the vehicle 1 releases the engine from drive load and lets the vehicle 1 start to roll the way up to the traffic light when the first other vehicle 2a is behind the vehicle 1 since the first other vehicle 2a may want to maintain the current speed and not slow down in order to be able to e.g. turn left while the traffic light is signaling green for a left turn.

The processing circuitry 102a, 102b is configured to cause the vehicle control system 100 to: determine that the vehicle 1 is approaching a stop point; determine if the vehicle 1 needs to stop at the stop point; determine the presence of at least a first other vehicle 2a, 2b, 2c within a predefined distance behind the vehicle 1; and determine the intended route of the at least first other vehicle 2a, 2b, 2c.

An advantage with this aspect is that with knowledge of the intended route of the at least first other vehicle 2a, 2b, 2c a decision to control the vehicle 1 or instruct a vehicle occupant 5 can be taken considering the intended route of the at least first other vehicle 2a, 2b, 2c, for example as illustrated in FIG. 2A, to avoid e.g. blocking the way for the first other vehicle 2a.

According to some embodiments, in a determination that the at least first other vehicle 2a, 2b, 2c is going in the same direction as the vehicle 1 after the stop point, preparing at least a first energy saving action. According to some embodiments, in a determination that the at least first other vehicle 2a, 2b, 2c also needs to stop at the stop point, preparing at least a first energy saving action. In this example both the vehicle 1 and the at least first other vehicle 2a, 2b, 2c can hence prepare at least a first energy saving action since both will have to stop at the stop point.

Knowing that the at least first other vehicle 2a is going in the same direction as the vehicle 1, for example straight ahead, means that the vehicle 1 is not blocking the way for the at least first other vehicle 2a, and hence a first energy saving action can be prepared, such as releasing the engine from drive load. In this example both the vehicle 1 and the at least first other vehicle 2a, 2b, 2c can hence prepare at least a first energy saving action since both will have to stop at the stop point.

According to some embodiments preparing at least a first energy saving action comprises at least any of releasing an engine from a drive load; turning off an engine; putting an engine in an idle mode; turning off the power supply to an engine; putting a gear box in neutral; starting to engine-brake the vehicle 1; changing gear up to engine-brake the vehicle 1; start rolling to the stop point; releasing the throttle; releasing a gas pedal; increasing throttle; start braking; starting a battery charging operation; starting a battery charging operation for braking the vehicle 1. According to some embodiments starting a battery charging operation may cause a braking effect on the vehicle 1 and the wear of the vehicle brakes can hence be avoided.

According to some embodiments, in a determination that the at least first other vehicle 2a, 2b, 2c is going in another direction as the vehicle 1 after the stop point, preparing at least a first energy saving action only when the at least first other vehicle 2a, 2b, 2c is in a different lane L2, other than the lane L1 of the vehicle 1, for avoiding blocking the way for the at least first other vehicle 2a, 2b, 2c.

Figure 2B:
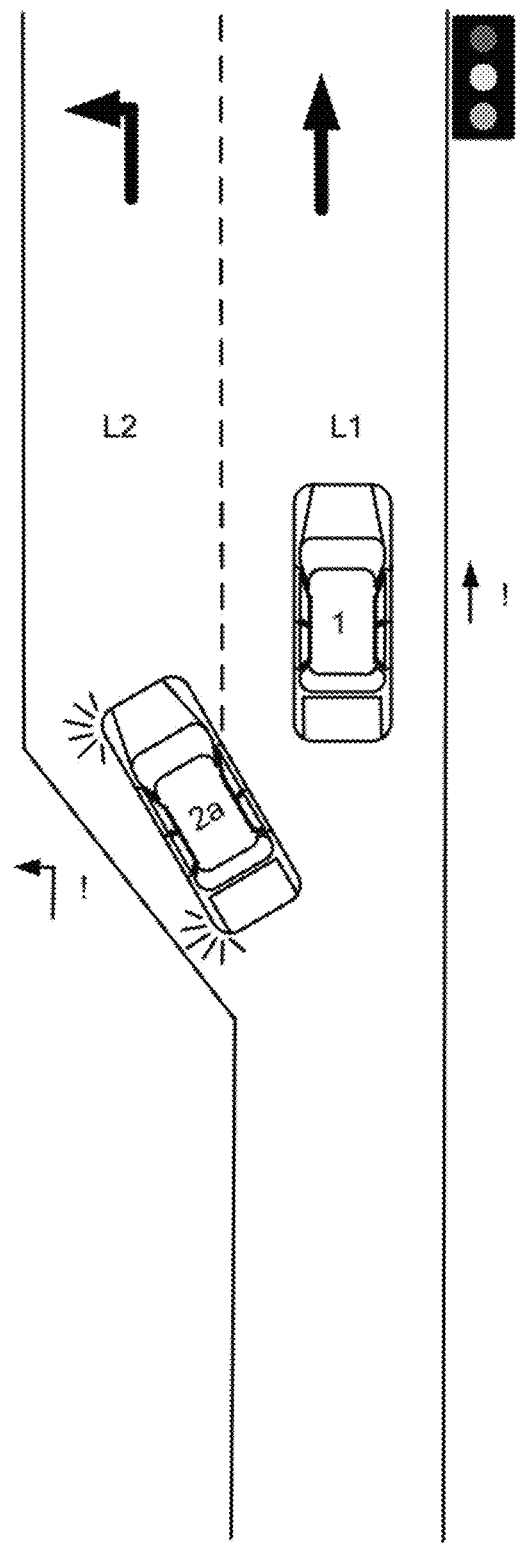
FIG. 2B illustrates an example when the vehicle and the first other vehicle are approaching a stop point at a traffic light when the intended route of the first other vehicle is determined.

Knowing that the at least first other vehicle 2a is going in another direction means that the vehicle 1 is blocking the way for the at least first other vehicle 2a when the vehicle 1 and the at least first other vehicle 2a are in the same lane, e.g. lane L1 as illustrated in FIG. 2A. By waiting with preparing for the at least first energy saving action until the at least first other vehicle 2a is in another lane, e.g. in lane L2 as illustrated in FIG. 2B, it can be avoided that the vehicle 1 is blocking the way for the at least first other vehicle 2a.

According to some embodiments, the vehicle control system 100 further comprises a wireless communication unit 103. According to some embodiments the wireless communication unit 103 is part of an on-board vehicle computer and operatively connected to the memory 101a. The wireless communication unit 103 is operatively connected to the processing circuitry 102a, 102b, configured to communicate via the wireless communication network 50, the processing circuitry 102a, 102b is further configured to cause the vehicle control system 100 to: send, by the vehicle 1, a request for a traffic information data message TIDM indicative of a request for the intended route of at least a first other vehicle 2a, 2b, 2c behind the vehicle 1; receive, at the vehicle 1, the traffic information data message TIDM indicative of the intended route of the at least first other vehicle 2a, 2b, 2c behind the vehicle 1.

Information of the intended route of the at least first other vehicle 2a, 2b, 2c can hence be provided wirelessly to the vehicle 1 over the air in a traffic information data message TIDM that is informing the vehicle 1 of the intended route of the at least first other vehicle 2a, 2b, 2c.

According to some embodiments the request for a traffic information data message is limited to a request for traffic information with respect to at least a first other vehicle 2a, 2b, 2c that is within a predetermined distance L from the vehicle 1. According to some embodiments the request for a traffic information data message comprises location information data defining the geographical position of the vehicle 1. According to some embodiments the predetermined distance L is dependent on the speed of at least any of the vehicle 1 and the at least first other vehicle 2a, 2b, 2c.

According to some embodiments the predetermined distance L is dependent on the remaining distance to the stop point of at least any of the vehicle 1 and the at least first other vehicle 2a, 2b, 2c. According to some embodiments the predetermined distance L is dependent on a signal interval of a traffic light at the stop point. According to some embodiments the predetermined distance L is dependent on the speed limit before the stop point.

According to some embodiments the traffic information data message TIDM comprises at least any of route information data from a navigation system of the at least first other vehicle 2a, 2b, 2c; vehicle control data of the at least first other vehicle 2a, 2b, 2c; historical routes of the at least first other vehicle 2a, 2b, 2c; driving statistics of the at least first other vehicle 2a, 2b, 2c; driving statistics of vehicles at the approaching stop point; a manual response by a vehicle occupant of the at least first other vehicle 2a, 2b, 2c.

Figure 3:
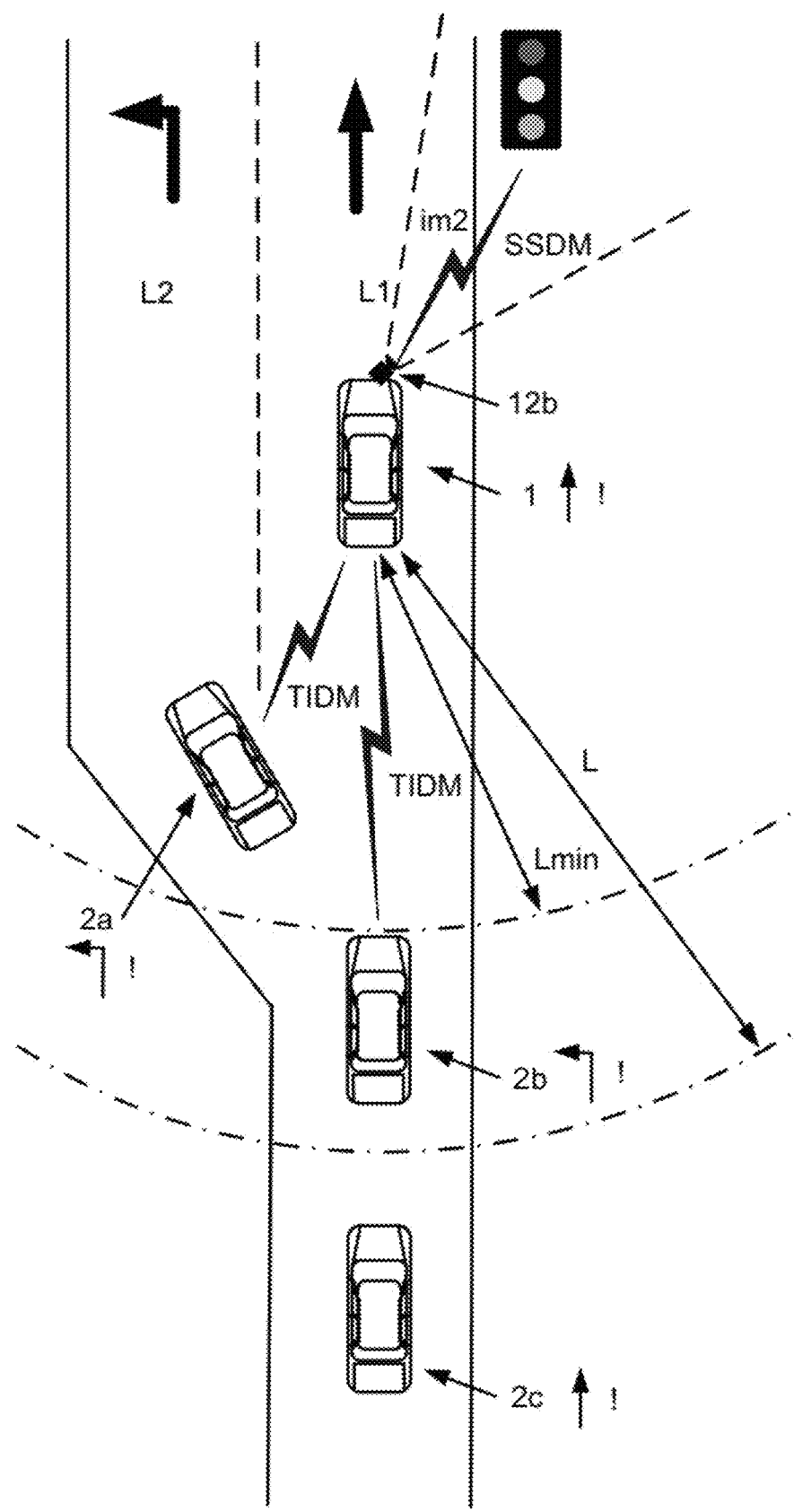
FIG. 3 illustrates an example when the vehicle and a first other vehicle, a second other vehicle and a third other vehicle are approaching a stop point at a traffic light.

FIG. 3 illustrates an example when the vehicle 1 and a first other vehicle 2a, a second other vehicle 2b and a third other vehicle 2c are approaching a stop point at a traffic light, when the intended route of the first other vehicle 2a and the intended route of the second other vehicle 2b are determined, while the intended route of the third other vehicle 2c is not determined since the third other vehicle 2c is not within a predefined distance L behind the vehicle 1.

According to some aspects, in a determination that the at least first other vehicle 2a, 2b, 2c is going in another direction as the vehicle 1 after the stop point, preparing at least a first energy saving action when the at least first other vehicle 2a, 2b, 2c is not within a predetermined minimum distance Lmin behind the vehicle 1.

In an example, as illustrated in FIG. 3, it is determined that the second other vehicle 2b is going in another direction as the vehicle 1 after the stop point, but that the second other vehicle 2b is not within a predetermined minimum distance Lmin that would make the vehicle 1 to block the way for the second other vehicle 2b, even if the vehicle 1 is preparing at least a first energy saving action.

Figure 4:
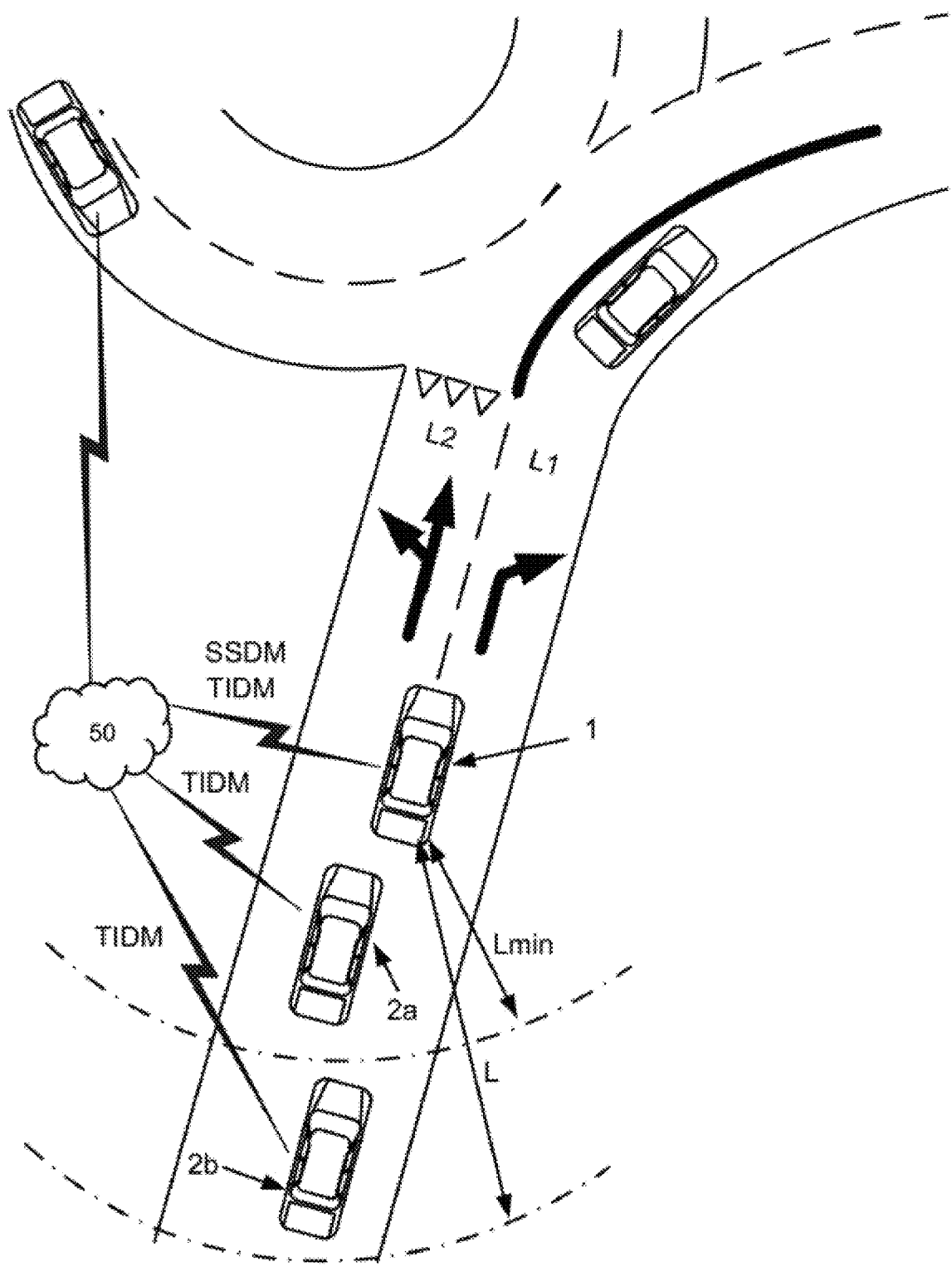
FIG. 4 illustrates an example when the vehicle, a first other vehicle and a second other vehicle are approaching a stop point at a roundabout.

FIG. 4 illustrates an example when the vehicle 1, a first other vehicle 2a and a second other vehicle 2b are approaching a stop point at a roundabout when the intended route of the first other vehicle 2a and the intended route of the second other vehicle 2b are determined.

In an example, as illustrated in FIG. 4, it is determined that the second other vehicle 2b is going in another direction as the vehicle 1 after the stop point namely to the right, while the vehicle 1, and the first other vehicle 2a are going left in the roundabout. However, it is determined that the second other vehicle 2b is not within a predetermined minimum distance Lmin, that would make the vehicle 1 to block the way for the second other vehicle 2b, even if the vehicle 1 is preparing at least a first energy saving action.

In a further example it is determined that the second other vehicle 2b is within a minimum distance of the first other vehicle 2a, that is about to go left in the roundabout. In the example the first other vehicle 2a communicates to the vehicle 1 that the first other vehicle 2a desires to maintain speed in order not to block the way for the second other vehicle 2b. In this further example it can therefore be determined that the vehicle 1 cannot prepare for at least a first energy saving action.

According to some aspects, the vehicle control system 100 further comprises at least a first exterior view camera 12a, 12b, 12c configured to obtain image data im1, im2, im3 of the surroundings of the vehicle 1. FIG. 1 illustrates the at least first exterior view camera 12a, 12b, 12c. In an example the at least first exterior view camera 12a, 12b, 12c is mounted on the outside or on the inside of the vehicle 1. According to some embodiments the at least first exterior view camera 12a, 12b, 12c is integrated into the body of the vehicle 1. According to some embodiments the at least first exterior view camera 12a, 12b, 12c obtains at least first image data im1, im2, im3 of at least a first exterior view of the surroundings outside of the vehicle 1. According to some embodiments the at least first exterior view camera 12a, 12b, 12c obtains a wide angle view of the surroundings outside of the vehicle 1 by a wide angle lens of the at least first exterior view camera 12a, 12b, 12c. According to some embodiments the at least first exterior view camera 12a, 12b, 12c obtains a telephoto view of the surroundings outside of the vehicle 1 by a telephoto lens of the at least first exterior view camera 12a, 12b, 12c. According to some embodiments the vehicle control system 100 comprises a combination of different exterior view cameras 12a, 12b, 12c for providing both a wide angle view and a telephoto view of the surroundings outside of the vehicle 1. According to some embodiments, as illustrated in FIG. 1, a first exterior view camera 12a and a second exterior view camera 12b are configured to obtain a first image data im1 and a second image data im2 that are overlapping.

The at least first exterior view camera 12a, 12b, 12c is operatively connected to the processing circuitry 102a, 102b and the processing circuitry 102a, 102b is further configured to cause the vehicle control system 100 to: obtain, by at least a first exterior view camera 12a, 12b, 12c of the vehicle 1, image data im1, im2, im3 of the surroundings of the vehicle 1; and determine an intended route of at least first other vehicle 2a, 2b, 2c behind the vehicle 1 based on the obtained image data im1, im2, im3.

Information of the intended route of the at least first other vehicle 2a, 2b, 2c can hence be provided via image data im1, im2, im3 of the surroundings of the vehicle 1, providing information about the intended route of the at least first other vehicle 2a, 2b, 2c.

According to some aspects relative movements of the at least first other vehicle 2a, 2b, 2c in relation to the vehicle 1 is detected in the image data im1, im2, im3 by image processing of the image data im1, im2, im3. According to some embodiments a relative movement of the at least first other vehicle 2a, 2b, 2c in relation to the ground is detected in the image data im1, im2, im3 by image processing of the image data im1, im2, im3. According to some aspects the detected relative movement of the at least first other vehicle 2a, 2b, 2c is used for determining the intended route of the at least first other vehicle 2a, 2b, 2c. According to some embodiments the intended route of the at least first other vehicle 2a, 2b, 2c is used as input for determining if the vehicle 1 is going to prepare at least a first energy saving action or not.

According to some embodiments the vehicle control system 100 further comprises a user interface 400. According to some embodiments the user interface 400 is the user interface of an on-board vehicle computer. According to some embodiments the vehicle control system 100 further comprises at least a first display configured to display the at least first exterior view provided by the at least first exterior view camera 12a, 12b, 12c. According to some embodiments the at least first display is a part of the vehicle control system 100. According to some embodiments the at least first display is integrated in the dashboard of the vehicle 1. According to some embodiments the at least first display is a head-up display that is visible at or on at least a first window of the vehicle 1. According to some embodiments the at least first display is a separate display unit that can be placed at a desired location in the vehicle 1. According to some embodiments the at least first display is a touch sensible display configured to operate as the user interface 400. According to some embodiments the processing circuitry 102a, 102b is further configured to provide driving instructions indicative of the intended route of the at least first other vehicle 2a, 2b, 2c. According to some embodiments the driving instructions indicative of the intended route of the at least first other vehicle 2a, 2b, 2c is provided to the display and displayed to a vehicle occupant 5 of the vehicle 1 via the user interface 400. The driving instructions indicative of the intended route of the at least first other vehicle 2a, 2b, 2c hence can support the vehicle occupant 5 in driving the vehicle 1 in an energy efficient way. According to some embodiments the vehicle 1 is an autonomous vehicle and the driving instructions indicative of the intended route of the at least first other vehicle 2a, 2b, 2c is provided to a processing circuitry of an on-board vehicle computer for controlling the operation of the vehicle 1.

Figure 5:
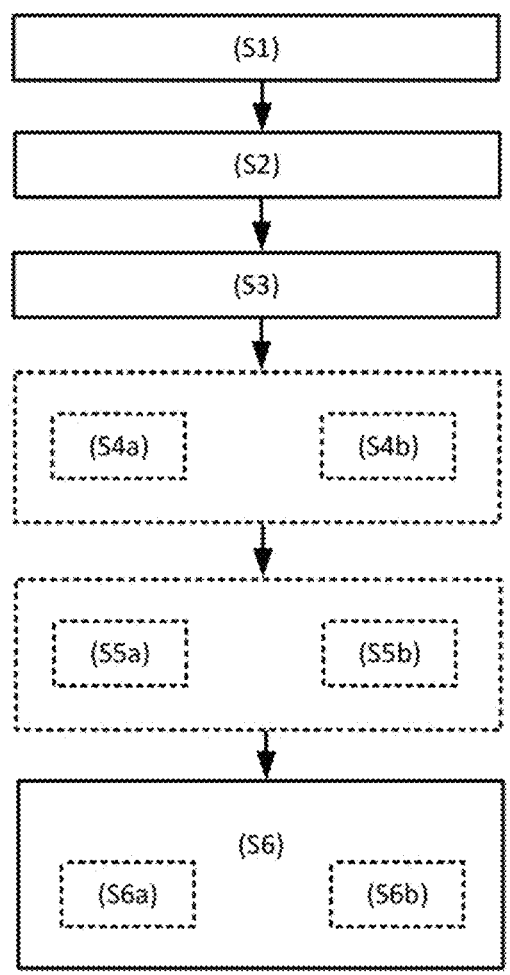
FIG. 5 illustrates a flow chart of the method steps according to the second aspect of the disclosure.

FIG. 5 illustrates a flow chart of the method steps according to the second aspect of the disclosure.

The second aspect of this disclosure shows a method for energy efficient driving of a vehicle 1, the method comprising: the step S1 determining that the vehicle 1 is approaching a stop point; the step S2 determining if the vehicle 1 needs to stop at the stop point; the step S3 determining the presence of at least a first other vehicle 2a, 2b, 2c within a predefined distance behind the vehicle 1; and the step S6 determining the intended route of the at least first other vehicle 2a, 2b, 2c.

An advantage with this aspect is that with knowledge of the intended route of the at least first other vehicle, a decision to control the vehicle or to instruct a vehicle occupant can be taken considering the intended route of the least first other vehicle to avoid e.g. blocking the way for the least first other vehicle.

According to some embodiments, the method comprising the step S6a, wherein in a determination that the at least first other vehicle 2a, 2b, 2c is going in the same direction as the vehicle 1 after the stop point, preparing at least a first energy saving action.

Knowing that the at least first other vehicle is going in the same direction means that the vehicle is not blocking the way for the at least first other vehicle, and hence a first energy saving action can be prepared, such as releasing the engine from drive load.

According to some embodiments, the method comprising the step S6b, wherein in a determination that the at least first other vehicle 2a, 2b, 2c is going in another direction as the vehicle 1 after the stop point, preparing at least a first energy saving action only when the at least first other vehicle 2a, 2b, 2c is in a different lane L2, other than the lane L1 of the vehicle 1, for avoiding blocking the way for the at least first other vehicle 2a, 2b, 2c.

Knowing that the at least first other vehicle is going another direction means that the vehicle is blocking the way for the at least first other vehicle when the vehicle and the at least first other vehicle are in the same lane, and by waiting with preparing for the at least first energy saving action until the at least first other vehicle is in another lane it can be avoided that the vehicle is blocking the way for the at least first other vehicle.

According to some embodiments, the method further comprises: the step S4a sending, by the vehicle 1, a request for a traffic information data message TIDM indicative of a request for the intended route of at least a first other vehicle 2a, 2b, 2c behind the vehicle 1; and the step S5a receiving, at the vehicle 1, the traffic information data message TIDM indicative of the intended route of the at least first other vehicle 2a, 2b, 2c behind the vehicle 1.

Information of the intended route of the at least first other vehicle can hence be provided wirelessly to the vehicle over the air in a traffic information data message that is informing the vehicle of the intended route of the at least first other vehicle.

According to some embodiments, the traffic information data message TIDM is sent and received via at least any of a wireless Vehicle-to-vehicle V2V communication network; a wireless Vehicle-to-Infrastructure V2I communication network; and a wireless Internet communication network.

Information of the intended route of the at least first other vehicle 2a, 2b, 2c can hence be provided wirelessly to the vehicle 1 over the air, via direct communication between the vehicle 1 and the at least first other vehicle 2a, 2b, 2c, and/or via communication between the vehicle 1 and an infrastructure node (e.g., electronic device 800), and/or via communication between the vehicle 1 and a wireless Internet communication network node. As illustrated in FIG. 1, the traffic information data message TIDM, can be sent using different wireless communication interfaces. According to some embodiments the wireless Vehicle-to-vehicle V2V communication network comprises a combination of direct communication between the vehicle 1 and the at least first other vehicle 2a, 2b, 2c and communication between the vehicle 1 and an infrastructure node (e.g., electronic device 800) for determining that the at least first other vehicle 2a, 2b, 2c is within a physical radio coverage radius of the vehicle 1. According to some embodiments traffic information data is aggregated in real-time from the vehicle 1 and from the at least first other vehicle 2a, 2b, 2c and stored in a memory 101b of an infrastructure node (e.g., electronic device 800) for generating a traffic information data message TIDM to a vehicle 1 upon request.

According to some embodiments, the method further comprises the step S4b obtaining, by at least a first exterior view camera 12a, 12b, 12c of the vehicle 1, image data im1, im2, im3 of the surroundings of the vehicle 1; and the step S5b determining an intended route of at least a first other vehicle 2a, 2b, 2c behind the vehicle 1 based on the obtained image data im1, im2, im3.

Information of the intended route of the at least first other vehicle can hence be provided via image data of the surroundings of the vehicle, providing information about the intended route of the at least first other vehicle.

According to some embodiments, the determination of the intended route of the method comprises a determination of at least any of an indication that a turn signal of the at least first other vehicle 2a, 2b, 2c is on or that the at least first other vehicle 2a, 2b, 2c is changing lane.

According to some embodiments an indication that a turn signal of the at least first other vehicle 2a, 2b, 2c is on is detected in the image data im1, im2, im3 by image processing of the image data im1, im2, im3. According to some aspects the turn signal of the at least first other vehicle 2a, 2b, 2c is used for determining the intended route of the at least first other vehicle 2a, 2b, 2c. According to some embodiments an indication of a left turn signal is used for determining that the intended route of the at least first other vehicle 2a, 2b, 2c is a left turn after the stop point. According to some embodiments an indication of a right turn signal is used for determining that the intended route of the at least first other vehicle 2a, 2b, 2c is a right turn after the stop point. According to some embodiments the vehicle 1 determines the number of available lanes and the available driving directions for each lane by information provided by at least any of a traffic information data message TIDM and image data im1, im2, im3 of the surroundings of the vehicle 1. In the example as illustrated in FIGS. 2A and 2B there are two lanes available, the right lane L1 for continuing straight ahead after the stop point, and the left lane L2 for a left turn after the stop point. In the example as illustrated in FIG. 2B the first other vehicle 2a has the left turn signal on which indicates that the first other vehicle 2a intends to use the left lane L2 and then turn left after the stop point.

According to some embodiments a relative movement of the at least first other vehicle 2a, 2b, 2c in relation to a line indication on the ground is detected in the image data im1, im2, im3 by image processing of the image data im1, im2, im3. According to some aspects the detected relative movement of the at least first other vehicle 2a, 2b, 2 in relation to the line indication on the ground is used for determining the intended route based on a lane change of the at least first other vehicle 2a, 2b, 2c. In an example with reference to FIG. 2B it can be determined that the first other vehicle 2a is changing lane by the crossing of the line that separates the right lane L1 from the left lane L2.

According to some embodiments the intended route of the at least first other vehicle 2a, 2b, 2c is used as input for determining if the vehicle 1 is going to prepare at least a first energy saving action or not.

According to some embodiments, determining if the vehicle 1 needs to stop at the stop point comprises receiving by the vehicle 1 a stop signal data message SSDM via at least any of a wireless Vehicle-to-vehicle V2V communication network; a wireless Vehicle-to-Infrastructure V2I communication network; a wireless Internet communication network, indicative of that the vehicle 1 needs to stop at the stop point.

The vehicle can hence be informed wirelessly over the air, in a stop signal data message SSDM, that the vehicle 1 needs to stop at a certain stop point that the vehicle 1 is approaching. According to some embodiments data defining the geographical position of the vehicle 1 and the at least first other vehicle 2a, 2b, 2c is aggregated in real-time and stored in a memory 101b of an infrastructure node (e.g., electronic device 800) for automatically generating a stop signal data message SSDM to be received at the vehicle 1 when the vehicle 1 is within a predefined distance from a stop point that the vehicle 1 is approaching. In an example as illustrated in FIG. 4, a stop signal data message SSDM is generated to be received at the vehicle 1 based on the current traffic in the roundabout that the vehicle 1 is approaching.

According to some embodiments, determining if the vehicle 1 needs to stop at the stop point comprises: obtaining, by at least a first exterior view camera 12a, 12b, 12c of the vehicle 1, image data im1, im2, im3 of the surroundings of the vehicle 1; and determining stop information based on the obtained image data im1, im2, im3.

According to some embodiments determining stop information based on the obtained image data im1, im2, im3 comprises image processing of the image data im1, im2, im3 for detecting stop information in the image data im1, im2, im3. According to some embodiments stop information comprises at least any of a detection of: a sign, a signal, a light, a text, a symbol, a vehicle and a person.

The vehicle can hence be informed, via image data of the surroundings of the vehicle, that the vehicle needs to stop at a certain stop point that is approaching, e.g. via a determination of a traffic light signaling red.

In the example as illustrated in FIG. 3, the second exterior view camera 12b of the vehicle 1 obtains image data im2 of the surroundings of the vehicle 1. In the example the image data im2 comprises an image of a traffic light with a red signal. By image processing of the image data im2 the red signal is detected as stop information.

Figure 6:
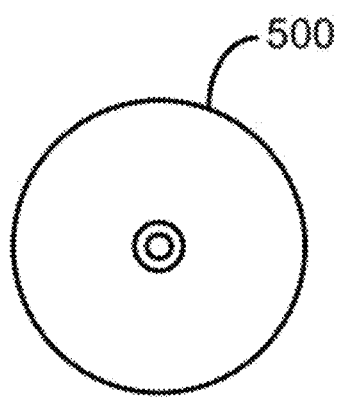
FIG. 6 illustrates a computer program product according to the third aspect of the disclosure.

FIG. 6 illustrates a computer program product 500 according to the third aspect of this disclosure. The computer program product 500, which comprises the method of the second aspect of the disclosure, comprises a non-transitory computer readable medium, having thereon a computer program comprising program instructions, the computer program being loadable into a processing circuitry 102*a*, 102*b* and configured to cause execution of the method when the computer program is run by at least one of the processing circuitry 102*a*, 102*b*.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

What is claimed is:

1. A vehicle control system for supporting energy efficient driving of an associated vehicle when the vehicle is approaching a stop point, the vehicle control system comprising:
    a processing circuitry comprising a processor; and
    a non-transitory memory device operatively coupled with the processing circuitry and configured to store data,
    wherein the processing circuitry is configured to:
       determine, based on at least one of a received stop signal data message or obtained image data of the vehicle's surroundings, that the vehicle is approaching the stop point;
       determine, based on at least one of the received stop signal data message or the obtained image data of the vehicle's surroundings, whether the vehicle needs to stop at the stop point;
       determine, based on obtained image data of the vehicle's surroundings, a presence of a first other vehicle within a predefined distance behind the vehicle;
       determine, based on at least one of a received traffic information data message or obtained image data of the vehicle's surroundings, an intended route of the first other vehicle;
       decide, based on the determined intended route of the first other vehicle, whether the vehicle is going to apply a first energy saving action that supports energy efficient driving; and
       issue, based on the determined intended route of the first other vehicle and the decision whether the vehicle is going to apply the first energy saving action, a control signal to the vehicle that automatically controls operation of the vehicle by causing the vehicle to apply, based on the issued control signal, the first energy saving action for energy efficient driving of the vehicle, wherein the first energy saving action is indicative of the intended route of the first other vehicle and comprises one or more of:
          releasing an engine from a drive load; turning off the engine; putting the engine in an idle mode; turning off power supply to the engine; putting a gear box in neutral; starting to engine-brake the vehicle; changing gear up to engine-brake the vehicle; start rolling to the stop point; releasing a throttle; releasing a gas pedal; increasing the throttle; starting to brake; starting a battery charging operation; and/or starting a battery charging operation for braking the vehicle.

2. The vehicle control system according to claim 1, wherein the processing circuitry:
    determines the intended route of the first other vehicle is the first other vehicle is going in the same direction as the vehicle after the stop point;
    decides, based on the intended route of the first other vehicle, the vehicle is going to apply the first energy saving action; and
    issues, based on the determined intended route of the first other vehicle and the decision, the control signal to the vehicle that automatically controls operation of the vehicle by causing the vehicle to apply, based on the issued control signal, the first energy saving action for energy efficient driving of the vehicle.

3. The vehicle control system according to claim 1, wherein the processing circuitry:
    determines the intended route of the first other vehicle is the first other vehicle is going in another direction as the vehicle after the stop point;
    decides, based on the intended route of the first other vehicle, the vehicle is going to apply the first energy saving action; and
    issues, based on the determined intended route of the first other vehicle and the decision, the control signal to the vehicle that automatically controls operation of the vehicle by causing the vehicle to apply, based on the issued control signal, the first energy saving action only when the first other vehicle is in a different lane than the lane of the vehicle to avoid blocking the first other vehicle, wherein the first energy saving action is applied for energy efficient driving of the vehicle.

4. The vehicle control system according to claim 1, wherein the vehicle control system further comprises:
    a wireless communication unit operatively connected to the processing circuitry and the non-transitory memory device, wherein the wireless communication unit is configured to communicate via a wireless communication network, wherein the processing circuitry is further configured to:
       send, by the wireless communication unit of the vehicle, a request for the traffic information data message indicative of a request for the intended route of the first other vehicle behind the vehicle; and
       receive, at the wireless communication unit of the vehicle, the traffic information data message indicative of the intended route of the first other vehicle behind the vehicle.

5. The vehicle control system according to claim 1, wherein the vehicle control system further comprises:
    at least a first exterior view camera operatively connected to the processing circuitry and the non-transitory memory device, wherein at least the first exterior view camera is configured to obtain image data of the surroundings of the vehicle, wherein the processing circuitry is further configured to:
       obtain, by at least the first exterior view camera of the vehicle, image data of the surroundings of the vehicle; and
       determine, based on the obtained image data, the intended route of the first other vehicle behind the vehicle.

6. A computer-implemented method executed on a processing circuitry of a vehicle control system for supporting energy efficient driving of an associated vehicle when the vehicle is approaching a stop point, the method comprising:

determining, by the processing circuitry and based on at least one of a received stop signal data message or obtained image data of the vehicle's surroundings, that the vehicle is approaching the stop point;

determining, by the processing circuitry and based on at least one of the received stop signal data message or the obtained image data of the vehicle's surroundings, whether the vehicle needs to stop at the stop point;

determining, by the processing circuitry and based on obtained image data of the vehicle's surroundings, a presence of a first other vehicle within a predefined distance behind the vehicle;

determining, by the processing circuitry and based on at least one of a received traffic information data message or obtained image data of the vehicle's surroundings, an intended route of the first other vehicle;

deciding, by the processing circuitry and based on the determined intended route of the first other vehicle, whether the vehicle is going to apply a first energy saving action that supports energy efficient driving; and issuing, by the processing circuitry and based on the determined intended route of the first other vehicle and the deciding whether the vehicle is going to apply the first energy saving action, a control signal to the vehicle that automatically controls operation of the vehicle by causing the vehicle to apply, based on the issued control signal, the first energy saving action for energy efficient driving of the vehicle, wherein the first energy saving action is indicative of the intended route of the first other vehicle and comprises one or more of:

releasing an engine from a drive load: turning off the engine: putting the engine in an idle mode: turning off power supply to the engine: putting a gear box in neutral: starting to engine-brake the vehicle: changing gear up to engine-brake the vehicle: start rolling to the stop point: releasing a throttle: releasing a gas pedal: increasing the throttle: starting to brake; starting a battery charging operation; and/or starting a battery charging operation for braking the vehicle.

7. The method according to claim 6, wherein:
the determining the intended route of the first other vehicle comprises determining that the first other vehicle is going in the same direction as the vehicle after the stop point;
the deciding comprises deciding the vehicle is going to apply the first energy saving action; and
the issuing comprises issuing the control signal to the vehicle that automatically controls operation of the vehicle by causing the vehicle to apply, based on the issued control signal, the first energy saving action for energy efficient driving of the vehicle.

8. The method according to claim 6, wherein:
the determining the intended route of the first other vehicle comprises determining that the first other vehicle is going in another direction as the vehicle after the stop point;
the deciding comprises deciding the vehicle is going to apply the first energy saving action; and
the issuing comprises issuing the control signal to the vehicle that automatically controls operation of the vehicle by causing the vehicle to apply, based on the issued control signal, the first energy saving action only when the first other vehicle is in a different lane than the lane of the vehicle to avoid blocking the first other vehicle, wherein the first energy saving action is applied for energy efficient driving of the vehicle.

9. The method according to claim 6, further comprising:
sending, by a wireless communication unit of the vehicle, a request for the traffic information data message indicative of a request for the intended route of the first other vehicle behind the vehicle; and
receiving, at the wireless communication unit of the vehicle, the traffic information data message indicative of the intended route of the first other vehicle behind the vehicle.

10. The method according to claim 9, wherein the sending and receiving of the traffic information data message comprises sending and receiving the traffic information data message via at least any of: a wireless Vehicle-to-vehicle communication network; a wireless Vehicle-to-Infrastructure communication network; and a wireless Internet communication network.

11. The method according to claim 6, further comprising:
obtaining, by at least a first exterior view camera of the vehicle, image data of the surroundings of the vehicle; and
determining, by the processing circuitry and based on the obtained image data, the intended route of the first other vehicle behind the vehicle.

12. The method according to claim 11, wherein the determining the intended route of the first other vehicle comprises determining at least one of an indication that a turn signal of the first other vehicle is on or an indication that the first other vehicle is changing lanes.

13. The method according to claim 6, wherein the determining whether the vehicle needs to stop at the stop point comprises:
receiving, by a wireless communication unit of the vehicle, a stop signal data message indicative of the vehicle needs to stop at the stop point via at least any of: a wireless Vehicle-to-vehicle communication network; a wireless Vehicle-to-Infrastructure communication network; and a wireless Internet communication network.

14. The method according to claim 6, wherein the determining whether the vehicle needs to stop at the stop point comprises:
obtaining, by at least a first exterior view camera of the vehicle, image data of the surroundings of the vehicle; and
determining, by the processing circuitry and based on the obtained image data, stop information.

15. A non-transitory computer readable storage medium storing a computer program comprising program instructions that, when executed by at least one processing circuitry or loaded onto the at least one processing circuitry, causes the at least one processing circuitry to perform a method for supporting energy efficient driving of an associated vehicle when the vehicle is approaching a stop point by:
determining, based on at least one of a received stop signal data message or obtained image data of the vehicle's surroundings, that the vehicle is approaching the stop point;
determining, based on at least one of the received stop signal data message or the obtained image data of the vehicle's surroundings, whether the vehicle needs to stop at the stop point;
determining, based on obtained image data of the vehicle's surroundings, a presence of a first other vehicle within a predefined distance behind the vehicle;
determining, based on at least one of a received traffic information data message or obtained image data of the vehicle's surroundings, an intended route of the first other vehicle;

deciding, based on the determined intended route of the first other vehicle, whether the vehicle is going to apply a first energy saving action that supports energy efficient driving; and issuing, based on the determined intended route of the first other vehicle and the deciding whether the vehicle is going to apply the first energy saving action, a control signal to the vehicle that automatically controls operation of the vehicle by causing the vehicle to apply, based on the issued control signal, the first energy saving action for energy efficient driving of the vehicle, wherein the first energy saving action is indicative of the intended route of the first other vehicle and comprises one or more of:

releasing an engine from a drive load; turning off the engine; putting the engine in an idle mode; turning off power supply to the engine; putting a gear box in neutral; starting to engine-brake the vehicle; changing gear up to engine-brake the vehicle; start rolling to the stop point; releasing a throttle; releasing a gas pedal; increasing the throttle; starting to brake; starting a battery charging operation; and/or starting a battery charging operation for braking the vehicle.

16. The non-transitory computer readable storage medium of claim 15, wherein:

the determining the intended route of the first other vehicle comprises determining that the first other vehicle is going in the same direction as the vehicle after the stop point;

the deciding comprises deciding the vehicle is going to apply the first energy saving action; and the issuing comprises issuing the control signal to the vehicle that automatically controls operation of the vehicle by causing the vehicle to apply, based on the issued control signal, the first energy saving action for energy efficient driving of the vehicle.

17. The non-transitory computer readable storage medium of claim 15, wherein:

the determining the intended route of the first other vehicle comprises determining that the first other vehicle is going in another direction as the vehicle after the stop point;

the deciding comprises deciding the vehicle is going to apply the first energy saving action; and the issuing comprises issuing the control signal to the vehicle that automatically controls operation of the vehicle by causing the vehicle to apply, based on the issued control signal, the first energy saving action only when the first other vehicle is in a different lane than the lane of the vehicle to avoid blocking the first other vehicle, wherein the first energy saving action is applied for energy efficient driving of the vehicle.

18. The vehicle control system of claim 1, wherein the vehicle control system determines the intended route of the first other vehicle based on detection, in the obtained image data, of at least one of an indication that a turn signal of the first other vehicle is on or an indication that the first other vehicle is changing lanes.

19. The vehicle control system according to claim 1, wherein the vehicle is an autonomous vehicle.

20. The method according to claim 6, wherein the vehicle is an autonomous vehicle.

* * * * *